Aug. 16, 1932.  G. P. BERRY  1,872,390

VACUUM SERVO BRAKE

Filed Aug. 17, 1929  2 Sheets-Sheet 1

Inventor
George P. Berry
By Blackmore, Spencer & Hulh
Attorneys

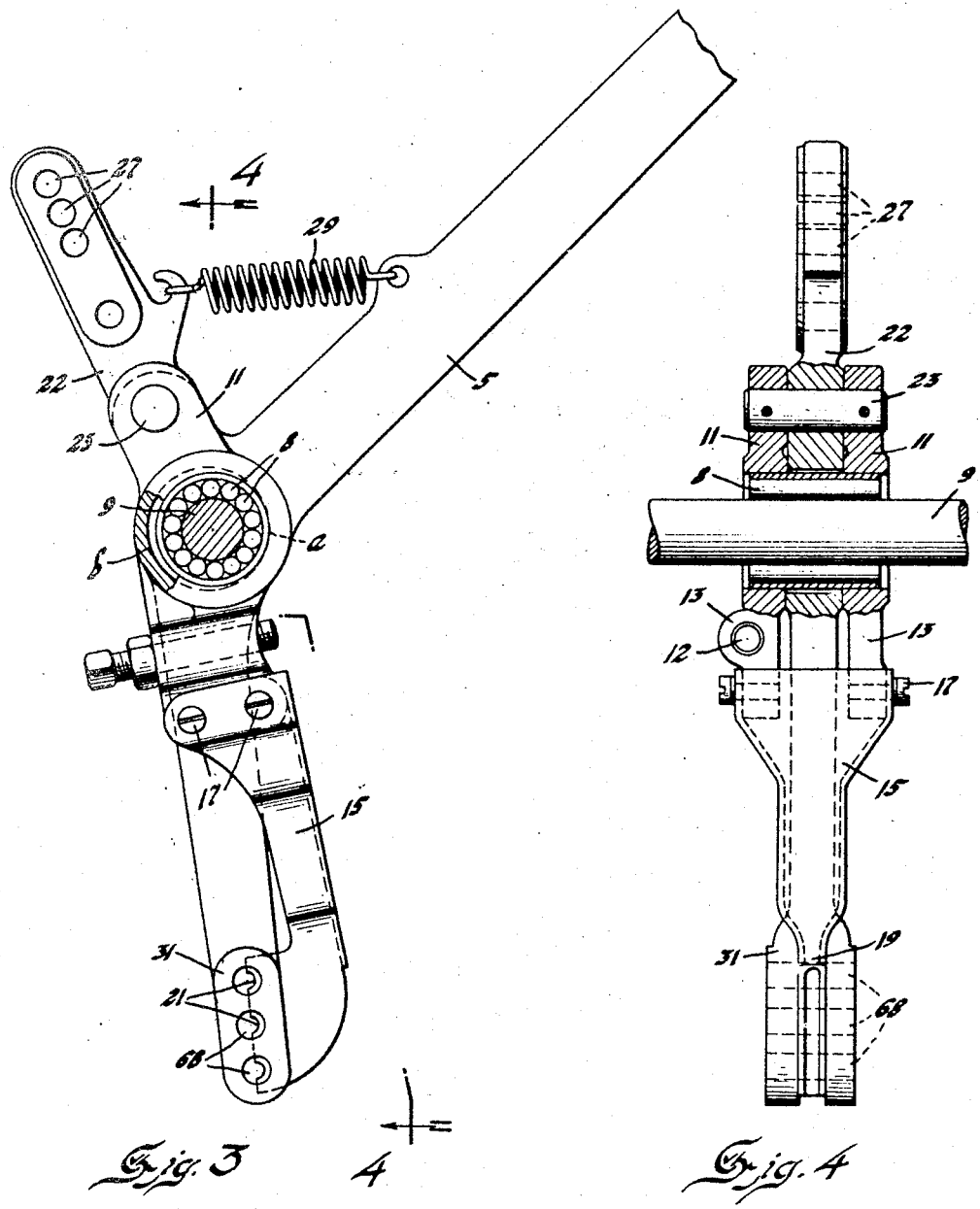

Patented Aug. 16, 1932

1,872,390

UNITED STATES PATENT OFFICE

GEORGE P. BERRY, OF DETROIT, MICHIGAN, ASSIGNOR TO GENERAL MOTORS RESEARCH CORPORATION, OF DETROIT, MICHIGAN, A CORPORATION OF DELAWARE

VACUUM SERVO BRAKE

Application filed August 17, 1929. Serial No. 386,502.

This invention relates to fluid pressure operated brakes wherein fluid pressure means is used as a Servo brake operating device under the control of the operator to apply the brakes. Among the objects of the invention are first to simplify the structure whereby the auxilliary power means is rendered active; second, to so design the structure that there shall be no braking action effected directly by the mechanical effort applied by the operator until after the maximum action of the Servo brake mechanism; third, to design an operating mechanism so that the power brake shall give a reaction on the pedal against the manually applied force of the operator in proportion to the intensity of the power braking instrumentality; fourth, to construct a novel brake applying means wherein the fluid pressure means may, under no circumstances, move the pedal in the direction of brake application; fifth, to so design the structure that at any time when the fluid pressure fails the brake may be applied by the application of the manual force through a direct mechanical connection, and also when the Servo brake is in operation at its maximum, further force may be applied by additional effort on the part of the operator. Other objects and advantages will be understood from the following description.

Figure 1:
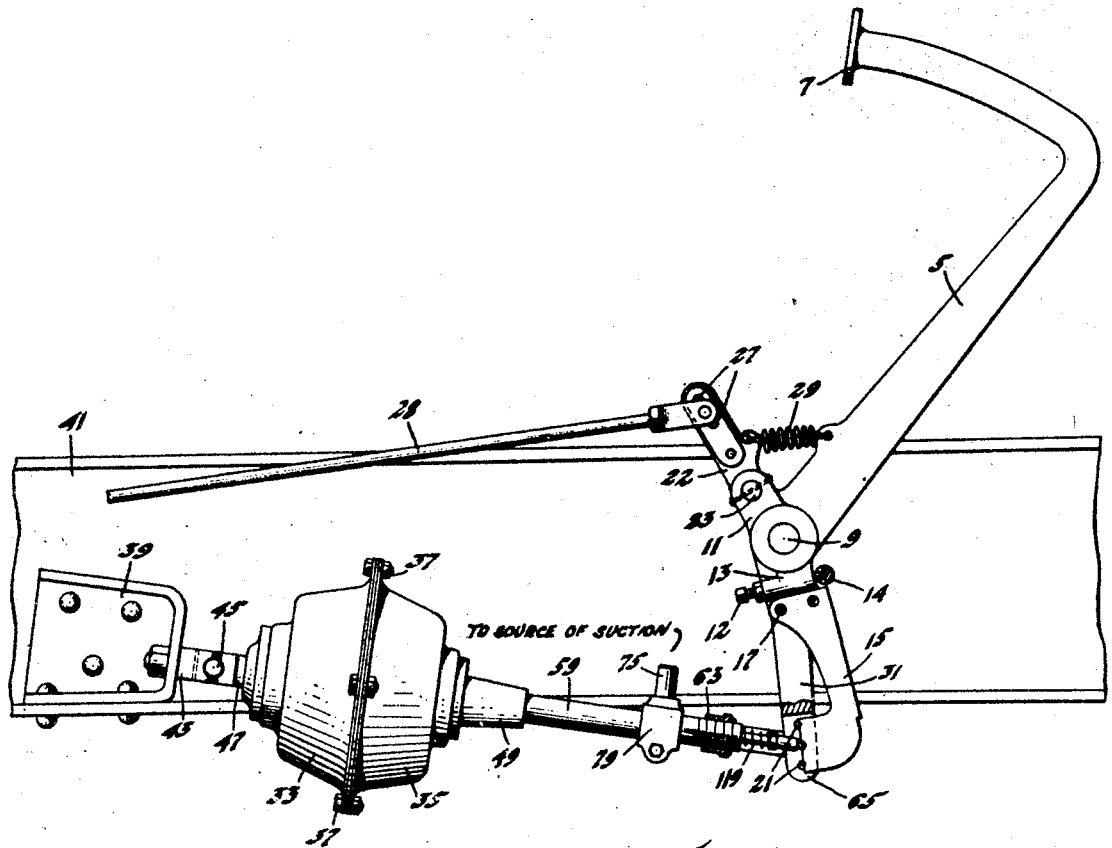
Figure 2:
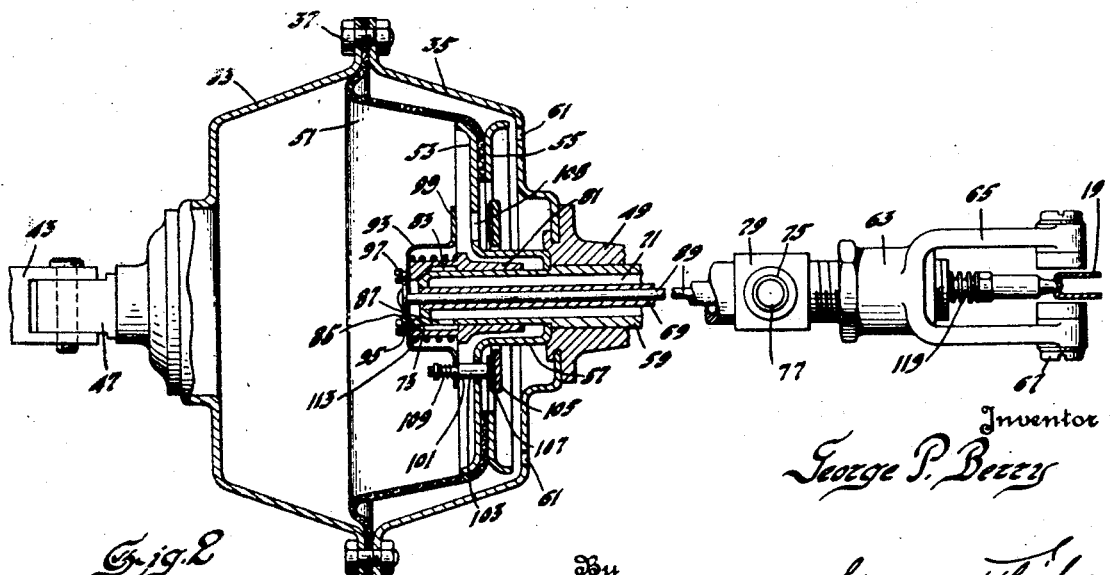

In the drawings, accompanying this description, Figure 1 is a view in side elevation partly in section. Figure 2 is a longitudinal section through the power operating mechanism. Figure 3 is a side elevation of the assembled pedal and brake lever. Figure 4 is a view substantially on line 4—4 of Figure 3. In general the invention comprises a power cylinder, a valve, a brake lever, and a pedal. The power cylinder includes a reciprocating member which is to be connected to the brake lever and by its movement to actuate the brakes through the rotation of the brake lever. The valve controls the admission of subatmospheric pressure to the power cylinder, this sub-atmospheric pressure being conveniently obtained from an engine manifold as is usual. The pedal is designed primarily to control the valve and incidentally to afford the means whereby the operator may supplement the action of the power brake when the latter is operating at its maximum intensity. The drawings show the several parts but omit the connection of the conduit from the valve to the source of suction. Referring by reference characters to the drawings numeral 5 is the pedal. It will be understood, of course, that in place of a pedal any manually operated lever may be used. The pedal is provided with a foot engagement part 7 and is rotatably supported upon a shaft 9, preferably by the use of roller bearings 8. The pedal has a second arm comprising forks 11. This arm is positioned somewhat above the pivot shaft 9. Another forked arm 13 is positioned below the pivot shaft 9 and carries an extension in the form of a stamping 15 secured to the fork ends 13 as by fastening means 17. This stamping extends considerably below the ends 13 of the pedal and at its extreme lower end is reduced in transverse dimension as at 19 and is provided with a plurality of vertically spaced recesses 21 as shown in Figure 3. Lever arm 13 is also provided with a screw or other adjusting member 12 to engage a fixed part 14, these parts 13 and 14 serving to limit the counter-clockwise rotation, or release movement of the pedal. What may be termed a brake lever is represented on the drawings by numeral 22. It has a central opening which is somewhat larger than the outer ring of bearing 8 and which opening surrounds that bearing. A pivot pin 23 is secured to the pedal arm 11 and rotatably supports the brake lever. Rotation of the brake lever about pivot 23 is limited by the engagement with the bearing ring at either one of two points of contact 'a' or 'b' as the lever swings about its pivot pin. Upwardly of pivot 23 the brake lever has a plurality of openings 27 for connection at either of these points with a brake rod 28. This rod 28 is merely illustrative of any convenient means by which the rotation of brake lever 22 may apply the vehicle brakes which may be of any preferred kind. A spring 29 connects the brake lever to the pedal and is located preferably as shown in the drawings. The lower end of the brake lever is forked as shown at 31, its forked ends straddling the lower end of stamping 15.

The power unit or power cylinder may be conveniently constructed from two conical parts 33 and 35. These two parts have their larger diameter portions secured together by suitable fastening means 37. Part 33 may be anchored by a bracket 39 secured to any convenient part of the vehicle as, for example, the channel frame member 41. The anchor consists of the member 43 secured in any convenient manner to part 39 and itself pivoted as at 45 to a lug 47 carried by part 33. Part 35 at its smaller end carries a piston guiding sleeve 49. A folding conical diaphragm 51 is clamped at its outer peripheral portion between parts 33 and 35 as shown in the drawings. Its inner and smaller periphery is clamped between a rigid reciprocating plunger 53 and a cooperating ring 55. Plunger 53 has a sleeve portion 57 which is rigidly secured to a hollow piston rod 59. Suitable openings 61 admit air at all times to the space within the power cylinder at one side, the right side, of the diaphragm, as shown in Figure 2. Piston rod 59 at its outer end is provided with a threaded sleeve 63 forked as at 65, its forked ends being secured by fastening means 67 to any one of a plurality of openings 68 in the ends of the brake lever. Within the tubular piston rod 59 is a concentric tube 69 forming an annular space 71 between these two tubular members. Adjacent the outer ends of tubes 59 and 69 the annular space is closed in any way found convenient. It is also closed at the inner ends of these parts as shown in Figure 2 where the outer part 59 is made in the form of a head closing the annular space and tapered to form a valve seat 73.

An inlet pipe 75 extending from the manifold of the engine or other source of suction not illustrated, communicates by means of an opening 77 in a ring 79 secured to the piston rod and suitable openings in piston rod with the annular space as will be clear from an inspection of the drawings. The suction from the manifold is transmitted from the manifold through the pipe 75 into the annular space 71 and to the left side of the diaphragm 51 when permitted to do so by the action of the valve described below. The valve in the present instance is preferably formed as a part of the power unit and incorporated therein. It includes a valve member 81 which as shown is slidable on the inner end of the piston rod 59. This valve member 81 is formed with an internal groove 83 near its inner end, the extreme inner end of the valve being provided with a valve face 85 which cooperates with the valve seat 73 to cut off the supply of suction from the manifold to the power cylinder. Suitable openings 87 in piston rod 59 afford communication between the annular space 71 and the groove 83. Since the pressure conditions in the groove are operating equally upon both ends of the groove these pressure conditions have no tendency to move the valve 81 in either direction and the valve may be said to be pressure balanced and is only moved by application of extraneous forces. When the valve 81 is moved to the left from the position shown in Figure 2 the face 85 is raised from the valve seat 73. The valve is therefore unseated and it will be obvious that the suction of the manifold is in communication with that part of the cylinder to the left of the diaphragm. This movement of unseating the valve is effected by a rod 89 which is mounted to reciprocate through the inner tube 69. The movement is produced by engagement of the outer end of the rod 89 with one of the recesses 21 of the stamping 15. It will be understood that the plurality of recesses 21 are provided to correspond with the plurality of openings 68 to which the forked member 65 of the piston rod may be attached. The inner end of rod 89 is attached to the center of the bottom of a cupped member 93. Passing through the bottom of the cup and spaced from its center are a plurality of bolts 95 with heads 97. These bolts extend through openings in the cup and are threaded into the valve member 81 as clearly shown in Figure 2. Movement of the cup 93 inwardly of the power cylinder causes the bottom of the cup to engage heads 97 and move the valve 81 in a similar inward direction whereby the valve is unseated. The annular flanges of the cup 93 represented by numeral 99 engage shoulders 101 on a circular series of bolts 103. Bolts 103 are guided in the openings in the plunger 53 and a valve ring 105 is carried by these bolts between the heads thereof and the second series of shoulders 107. By this means the ring 105 is held from movement axially along the bolt and also in spaced relation to the flanges 99 of the cup. Ring 105 is designed to at times close a series of openings 108 in the plunger 53. Surrounding the bolts are springs 109 engaging the flange 99 and suitable abutments on the end of the bolts. A spring 113 surrounds the inner end of the valve 81 engaging a shoulder on said valve member and the inner portion of the bottom of the cup. Surrounding the outer end of rod 89 there is as shown a spring 119 normally pressing the rod outwardly so that its extreme end engages the recesses 21 as explained above. This spring is in abutment with the head 63 between the forks 65 and another abutment on the rod 69.

The operation of the device is substantially as follows:

The pedal is held against stop 14 by the combined action of springs 119 and 29 and the brake lever is in contact with the outer bearing ring 8 at point 'a'. With the pedal and lever in these positions, the spring 113 insures the closure of the suction valve while the pressure of the spring 119 through rod 89 pulls the air valve open. If now it is desired to apply the brake, the pedal is depressed turning clockwise. If spring 29 is used and offers at the start greater resistance than does the taking up of clearance at the brakes, the pedal 5 and the lever 22 move as a unit during this initial action of the pedal. The resistance at the brake then becomes greater than that of spring 29 with the result that the pedal turns relatively to the brake lever. In so doing the point 27 acts as a fulcrum for lever 22. Lever 22 is rotated in a counter-clockwise direction about its fulcrum 27 by clockwise rotation of the pedal acting upon the brake lever 22 by the connecting pin 23. This movement results in the breaking of the contact at 'a' and the contact at 'b' is approached. When the contact at 'a' is broken, the rod 89 closes the air valve. The next increment of motion causes the cup 93 to engage the heads 97 and the suction valve opens. These valve actions occur while the points 'a' and 'b' are both out of contact. The plunger 53 is then in an unbalanced position between sub-atmospheric pressure at its left, and atmospheric pressure on its right side. It therefore moves inwardly in the power cylinder. This tends to cause a pull through the piston rod 59 on the lower end of the brake lever 22 and the power brake is actuated. The operation may perhaps best be understood by assuming that point 27 is the fulcrum of lever 22. The developing suction in the power cylinder is operating to rotate the pull in a counter-clockwise direction through its connection at 23. When this developed force is sufficient to balance the pedal pressure, the inward movement of 59 has caused the engagement of the valve members 73 and 85 and the suction valve is closed. The manually applied pressure at the pedal with its long leverage balances the forces acting at points 27 and at the lower end of the brake lever, and the operator easily resists the tension on the brake rods and "feels" the intensity of the power brake. This action of automatically cutting off the source of suction is not attended by the opening of the air valve unless the operator removes his foot from the pedal. Therefore the brakes remain applied with a predetermined degree of intensity which is measured by the resistance felt by the operator on the foot pad 7. They may be released by the removal of the pressure at 7 whereupon the spring 119 opens the air valve, or additional fluid pressure braking action may be secured by a further depression of the pedal whereupon the action occurs as before. It will also be understood that a diminution of pressure on the pedal will be attended by a proportionate reduction of the intensity of the force applied by the vacuum Servo device. It should be observed that in so applying the brake the operator has done nothing but control the valve. No part of his manually applied force has directly operated on the brake. The tension in the brake rod 28 and in piston rod 59 constitute forces acting upon pivot 23 tending to rotate the pedal counter-clockwise which forces are resisted by the manual effort on the pedal. The effort required is but little, owing to the long leverage of the pedal as compared with the short arm between pivot 23 and the pedal pivot 9. The "feel" is therefore present and is in proportion to the intensity of the power brake. Again and particularly important the power brake insofar as it affects the pedal never tends to move it in the direction of brake application. The only influence is one tending to move it against the force exerted by the operator. There is never a tendency of the pedal to move from the foot of the operator which movement is characteristic of some of the power brakes. Only when the brake lever reaches its second contact at 'b' can manual effort be applied to actuate the brake directly. When so in contact at 'b' the brake lever and the pedal act as one. This may occur if the suction brake for any means is inoperative. It may also occur at any time while the suction brake is operating at its maximum, by depressing the pedal sufficiently not only to keep up with the rotation of the brake lever, but to maintain the contact between the brake lever and the pedal at 'b' whereupon any desired manual effort may be added to the Servo brake.

Incidental to the construction, it should be noted that the pressure condition within the groove of the valve member 81 is effective in both directions so that the valve itself is in balanced condition and has no tendency to move one way or the other except by application of extraneous forces. It will also be seen that the springs 109 permit the cup to be moved inwardly and the suction valve to open after the air valve has been closed. The springs 113 insure the closing of the suction valve when the parts are in position to permit it to so function. The construction is extremely simple, occupying but little more room than the ordinary pedal. Compactness is also attained by the incorporation of the valve within the power unit and by the concentric relation of the operating rod 89 within the piston rod 59. By the arrangement of the double conical power cylinder with the foldable diaphragm a comparatively long stroke is given the piston and its rod such as could not occur were the diaphragm substantially flat.

It may be explained that the spring 29 operates to permit the clearance at the brake to be taken up before the relative movement between the pedal and the brake lever introduce the suction brake operating mechanism. This spring may be omitted if desired. In the absence of spring 29, spring 119, will serve to restore the pedal to its position of release and against the stop.

I claim:

1. In Servo power mechanism, a manually operated member, a pivot therefor, a second member directly pivoted to said manually operated member at a point thereon removed from the pivot thereof, means affording a limited relative movement between said members, means connected to said second member whereby said member may by its movement perform work, a power element having a movable part connected to said second member and a control device for rendering said power element active, mechanism moved by said manually operated member to actuate said control device.

2. In Servo power mechanism, a manually operated member, a fulcrum therefor, a second member pivoted to said first named member and surrounding with a clearance the said fulcrum, a brake applying rod connected to said second member on one side of its pivot, a power device having a movable part connected to said second member to rotate it about its pivot with the manually operable member, a valve to control said power device and movable means moved by said manually operable member to actuate said valve.

3. In Servo power brake mechanism, a pedal, a lever pivoted to an arm thereof, a tension element connected to one arm of said lever, a fluid pressure power device connected to a second arm of said lever, a control valve, means whereby the movement of said lever about its pivot is limited and means operated by said pedal upon a movement thereof relative to said lever to actuate said valve whereby the power device is rendered active to rotate said lever.

4. The invention defined by claim 3, said power device including a movable element and a piston rod, said valve being associated with said power device and the last mentioned means being a rod reciprocably concentric with reference to said piston rod.

5. The invention defined by claim 3 said power device including a movable element together with a piston rod, said valve being associated with said power device and the last named means being a rod reciprocable concentrically with reference to said piston rod, said piston rod being formed with an annular space for connection with a source of subatmospheric pressure and said valve controlling the communication between said space and said power device.

6. A power brake operating mechanism comprising a manually operated lever having a pivot, a brake lever pivoted thereto at a point removed from the pivot of the manually operated lever, means affording a limited relative movement between said manually operated lever and said brake lever, said means comprising a ring member constituting a part of the brake lever and surrounding the pivot of said manually operable lever, a power device connected to said brake lever and a valve means operable by said manually operable lever upon its movement relative to said brake lever.

7. The invention defined by claim 6, said valve means being incorporated within said power device.

8. The invention defined by claim 6, said power device including a movable piston and said valve means being associated with said piston.

9. In a Servo brake, a pedal, a brake lever, a power device, brake linkage, said power device and brake linkage being attached at spaced points to said brake lever, means to connect said brake lever at a point between the points of connection of said power device and linkage to an arm of said pedal, means affording a lost motion connection between said brake lever and pedal at a point removed from said last mentioned connection, a valve controlling the action of said power device and a member moved by relative movement of said pedal and brake lever to actuate said valve.

10. The invention defined by claim 9, said last motion connection being adjacent the pivot of said pedal.

11. The invention defined by claim 9, said power device including a plunger and a plunger rod, said plunger rod being connected to said brake lever and said valve device, having associated therewith a rod, said rod being concentric with said plunger rod and moved to engage by the end of said pedal.

12. In a Servo brake, a manually operable lever, fulcrum means therefor and brake lever, power means connected to said brake lever, a brake applying member also connected to said brake lever means pivotally connecting said levers at a point removed from said fulcrum means, a lost motion connection between said levers, said lost motion connection being removed from said pivotally connecting means, valve means controlled by a relative movement between said levers whereby the valve means is operable to render the power means active, said lost motion connection being positioned substantially adjacent the pivot of said brake lever.

In testimony whereof I affix my signature.

GEORGE P. BERRY.